(12) United States Patent
Nakagawa (10) Patent No.: US 10,244,576 B2
(45) Date of Patent: Mar. 26, 2019

(54) COMMUNICATION APPARATUS, COMMUNICATION METHOD, AND NON-TRANSITORY COMPUTER-READABLE STORAGE MEDIUM

(71) Applicant: CANON KABUSHIKI KAISHA, Tokyo (JP)

(72) Inventor: Toshiyuki Nakagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 15/286,939

(22) Filed: Oct. 6, 2016

(65) Prior Publication Data
US 2017/0105242 A1    Apr. 13, 2017

(30) Foreign Application Priority Data

Oct. 7, 2015    (JP) .................................. 2015-199720

(51) Int. Cl.
| H04L 25/08 | (2006.01) |
|---|---|
| H04L 29/08 | (2006.01) |
| H04W 76/25 | (2018.01) |
| H04W 84/12 | (2009.01) |

(52) U.S. Cl.
CPC ............. *H04W 76/25* (2018.02); *H04L 25/08* (2013.01); *H04L 67/142* (2013.01); *H04L 69/326* (2013.01); *H04W 84/12* (2013.01)

(58) Field of Classification Search
CPC ............................. H04W 76/045; H04L 25/08
USPC ........................................................ 370/329
See application file for complete search history.

(56) References Cited

U.S. PATENT DOCUMENTS

| 6,236,650 B1* | 5/2001 | Le Dantec | .......... H04L 12/1877 370/346 |
|---|---|---|---|
| 8,355,389 B2* | 1/2013 | Kasslin | ................ H04L 41/083 370/338 |
| 8,363,578 B1* | 1/2013 | Ramamurthy | ........ H04W 72/02 370/310 |
| 9,155,110 B2* | 10/2015 | Jeffery | .............. H04W 74/0808 |
| 9,497,781 B2* | 11/2016 | Jeffery | .............. H04W 74/0816 |
| 9,900,782 B2* | 2/2018 | McHenry | .............. H04W 16/14 |
| 2006/0030362 A1* | 2/2006 | Fukuda | ................. H04W 48/12 455/561 |

(Continued)

FOREIGN PATENT DOCUMENTS

| JP | 2010-141625 A | 6/2010 |
|---|---|---|
| JP | 2010-278825 A | 12/2010 |
| JP | 2014-183422 A | 9/2014 |

*Primary Examiner* — Peter G Solinsky
(74) *Attorney, Agent, or Firm* — Carter, DeLuca & Farrell, LLP (57) ABSTRACT

A communication apparatus establishes a communication session with another communication apparatus in a predetermined wireless channel; a determination unit configured to determine a detection of an interference radio wave in the predetermined wireless channel; and a transmission unit configured to, if the communication session is established by the establishment unit, transmit at a predetermined interval a signal for maintaining the communication session, wherein the transmission unit, in response to the detection of the interference radio wave in the predetermined wireless channel being determined by the determination unit, transmits the signal regardless of the predetermined interval.

20 Claims, 10 Drawing Sheets

(56) References Cited

U.S. PATENT DOCUMENTS

| | | | |
|---|---|---|---|
| 2010/0105332 A1* | 4/2010 | McHenry | H04W 16/14 455/62 |
| 2015/0016303 A1* | 1/2015 | Park | H04W 48/16 370/254 |
| 2016/0262173 A1* | 9/2016 | Josiam | H04B 7/0452 |
| 2017/0041869 A1* | 2/2017 | Homchaudhuri | H04W 52/0206 |
| 2017/0079060 A1* | 3/2017 | Keating | H04W 72/1278 |
| 2017/0134975 A1* | 5/2017 | Huang | H04W 24/08 |
| 2017/0201889 A1* | 7/2017 | McHenry | H04W 16/14 |
| 2017/0334572 A1* | 11/2017 | Dunn, Jr. | B64D 37/32 |

* cited by examiner

F I G. 1

F I G. 2

F I G. 3

F I G. 5

Channel Switch Announcement element format

| Element ID | Length | Channel Switch Mode | New Channel Number | Channel Switch Count |
|---|---|---|---|---|
| 1 | 1 | 1 | 1 | 1 |

Octets:

FIG. 10

COMMUNICATION APPARATUS, COMMUNICATION METHOD, AND NON-TRANSITORY COMPUTER-READABLE STORAGE MEDIUM

BACKGROUND OF THE INVENTION

Field of the Invention

The present invention relates to a communication apparatus, a communication method, and a non-transitory computer-readable storage medium.

Description of the Related Art

In a wireless LAN specification standardized by IEEE 802.11h, so that wireless LAN communication does not influence a weather radar or the like, an access point is required to be equipped with a DFS (Dynamic Frequency Selection) function for dynamically changing wireless LAN channels. An access point equipped with a DFS function, if using a portion of a 5 GHz frequency band (W53/W56) must continuously monitor for radar radio waves, and must monitor whether or not there is radar in a wireless LAN channel prior to usage for 60 seconds. For this reason, communication with a partner apparatus is stopped for 60 seconds if such an access point detects a radar radio wave, and transitions the wireless LAN channel to another W53/W56 band.

Accordingly, a method of, in the case of communication that is easily influenced by radio wave interference such as streaming, selecting a wireless LAN channel based on a degree of interference from among wireless LAN channels that can be used has been proposed (see Japanese Patent Laid-Open No. 2014-183422). In this method, a scheme is taken in which a wireless LAN channel for which a radar radio wave is detected in a predetermined period is not used. Also a wireless transmission system for performing transmission of data for which concurrency is required and transmission of data for which concurrency is not required even in an environment in which interference between radar and radio waves is present (see Japanese Patent Laid-Open No. 2010-141625) has been proposed. In such a wireless transmission system, in addition to being able to stably transmit real-time data such as video and audio information and the like for which concurrency is required, it becomes possible to transmit non-real-time data for which concurrency is not required, maintaining high speed. Furthermore, a method in which when a radar radio wave is detected in a wireless LAN channel that is in use, wireless communication is restarted immediately by changing to a wireless LAN channel on which a radar radio wave is not detected out of wireless LAN channels monitored in advance (see Japanese Patent Laid-Open No. 2010-278825) has been proposed.

Note that when communication stops for 60 seconds due to the DFS function during communication by wireless LAN, there are cases in which a communication session times out, and the connection is cut. For example, at a time of wireless LAN video streaming, such as Wi-Fi Miracast, an RTSP (Real Time Streaming Protocol) and an RTP (Real-time Transport Protocol) session are cut, and to restart the video streaming the user must again perform a connection operation. However, no method for preventing a video streaming session from timing out during a wireless LAN channel switch upon detection of a radar radio wave and the connection being cut has been proposed in any of Japanese Patent Laid-Open No. 2014-183422, Japanese Patent Laid-Open No. 2010-141625 or Japanese Patent Laid-Open No. 2010-278825.

SUMMARY OF THE INVENTION

The present invention provides a technique for maintaining a communication session even if communication stops due to detection of an interference radio wave.

According to one aspect of the present invention, there is provided a communication apparatus, which comprises: an establishment unit configured to establish a communication session with another communication apparatus in a predetermined wireless channel; a determination unit configured to determine a detection of an interference radio wave in the predetermined wireless channel; and a transmission unit configured to, if the communication session is established by the establishment unit, transmit at a predetermined interval a signal for maintaining the communication session, wherein the transmission unit, in response to the detection of the interference radio wave in the predetermined wireless channel being determined by the determination unit, transmits the signal regardless of the predetermined interval.

Further features of the present invention will become apparent from the following description of exemplary embodiments (with reference to the attached drawings).

DESCRIPTION OF THE EMBODIMENTS

Below, with reference to the attached drawings, a detailed explanation is given for the present invention based on embodiments. Note that configurations shown in the following embodiments are merely examples, and the present invention is not limited to the illustrated configurations.

First Embodiment

Figure 1:
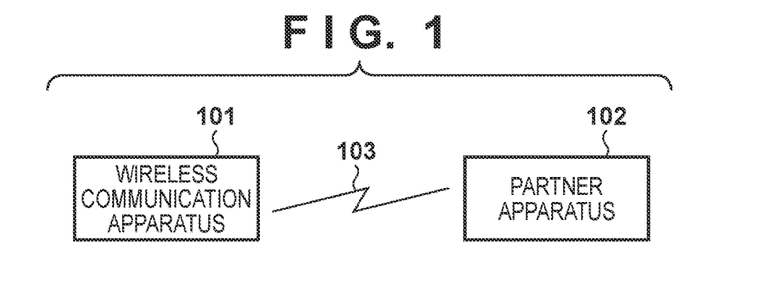
FIG. 1 is a view illustrating a connection configuration of a wireless communication apparatus 101 and a partner apparatus 102.

FIG. 1 is a view that illustrates a connection configuration between a wireless communication apparatus 101 and a partner apparatus 102 according to the first embodiment. The wireless communication apparatus 101 and the partner apparatus 102 are connected to each other so as to be able to communicate using a wireless channel via a wireless network 103. In the present embodiment, the wireless communication apparatus 101 and the partner apparatus 102 are equipped with a communication function for transmitting/receiving video data for example. For example, the communication function that the wireless communication apparatus 101 and the partner apparatus 102 are equipped with may be a communication function using a connection type communication protocol such as HTTP, TCP, RTSP, SIP, or SOAP.

The wireless communication apparatus 101 is, for example, a tablet, a smart phone, a PC, a mobile telephone, a television, a camera, a video camera or a head mounted display, but so long as it satisfies the later described hardware configuration and functional configuration, it is not limited to these. Meanwhile, the partner apparatus 102 is a tablet, a smart phone, a PC, a display, a mobile telephone, a television, a camera, a video camera, a head mounted display, a projector, or the like for example, but it is not limited to these.

The wireless network 103 is a wireless LAN that the wireless communication apparatus 101 and the partner apparatus 102 join, and a wireless network corresponding to, for example, the IEEE 802.11ac specification. Note, in the present embodiment, the wireless communication apparatus 101 uses W53 and W56 bands, for which monitoring for radar radio waves is required, out of a 5 GHz frequency band. Note, by a setting of the wireless LAN channel by a user, the wireless communication apparatus 101 can use W52 and W58, for which monitoring for radar radio waves is unnecessary, or a 2.4 GH frequency band.

Figure 2:
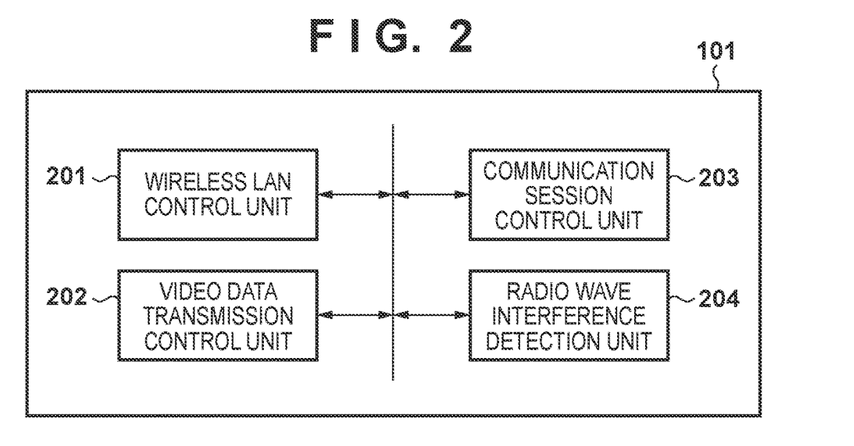
FIG. 2 is a view illustrating an example of a functional configuration of the wireless communication apparatus 101.

FIG. 2 is a view for illustrating an example of a functional configuration of the wireless communication apparatus 101. A wireless LAN control unit 201 performs control for performing transmission/reception of a wireless signal with other wireless LAN apparatuses on a predetermined wireless LAN channel setting. A video data transmission control unit 202 performs control for performing transmission of video data to the partner apparatus 102. In the present embodiment, Wi-Fi Miracast mirroring of a screen by wireless LAN is used as the communication method for the video data. Wi-Fi Miracast uses RTP (Real-time Transport Protocol) as a data transfer protocol. RTP is a protocol for transmitting/receiving multimedia data such as a moving image or audio in real-time via a network standardized to RFC 3550 by IETF (The Internet Engineering Task Force), and it uses UDP as a lower layer transport protocol.

A communication session control unit 203 performs playback control in relation to the partner apparatus 102 and communication session control such as maintenance of the communication session. Wi-Fi Miracast uses RTSP (Real Time Streaming Protocol) as the protocol of the playback control. RTSP is a protocol for controlling streaming standardized by RFC 2326, and uses TCP as a lower layer transport protocol.

A radio wave interference detection unit 204 performs control for monitoring and detecting interference radio waves (hereinafter referred to as radar radio waves) emitted by a radar of a weather radar or a military radar that become interference of the communication by the wireless communication apparatus 101.

Figure 3:
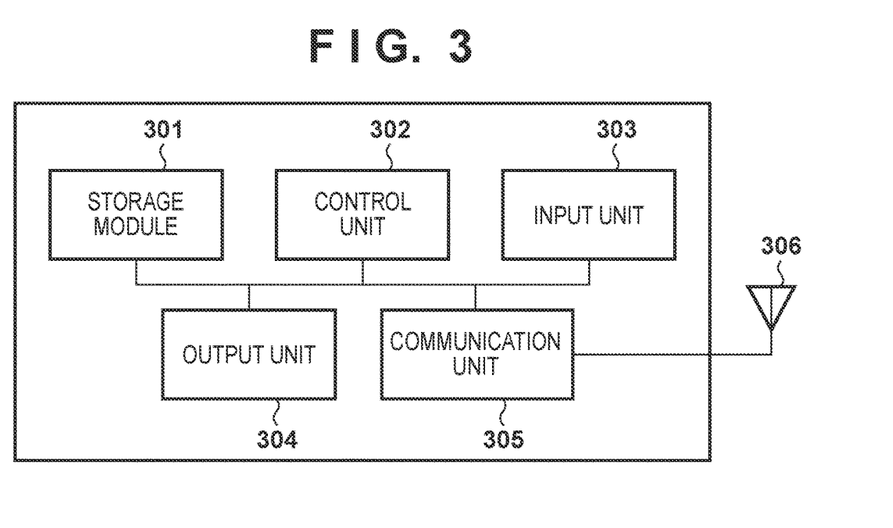
FIG. 3 is a view illustrating an example of a hardware configuration of the wireless communication apparatus 101.

FIG. 3 is a view for illustrating an example of a hardware configuration of the wireless communication apparatus 101. A storage unit 301 is configured by a memory such as a ROM (Read Only Memory) or a RAM (Random Access Memory). The storage unit 301 stores a program to perform later described various operations and various information such as communication parameters for the wireless communication. Note, apart from a memory such as a ROM and a RAM, a storage medium such as a flexible disk, a hard disk, an optical disc, a magneto-optical disk, a CD-ROM, a CD-R, a magnetic tape, a non-volatile memory card or a DVD may be used as the storage unit 301. Also, the storage unit 301 may be equipped with a plurality of memories.

A control unit 302 is configured by a processor such as a CPU (Central Processing Unit) or an MPU (Micro Processing Unit). The control unit 302 controls the whole wireless communication apparatus 101 by executing a program stored in the storage unit 301. Also, configuration may be taken such that the control unit 302 is equipped with a plurality of processors such as a multi-core, and controls the whole wireless communication apparatus 101 by the plurality of processors.

An input unit 303 accepts various operations from a user. An output unit 304 performs various output towards a user. Here, the output by the output unit 304 includes at least one of displaying on a screen, an audio output by a speaker and a vibration output or the like. Note, configuration may be taken so as to implement both the input unit 303 and the output unit 304 by one module as a touch panel. The output unit 304 is configured by, for example, an LCD (Liquid Crystal Display) or an LED (Light Emitting Diode) in a case of performing an output by displaying. The output unit 304 outputs information that users are able to visibly recognize, and performs display control of various UIs (User Interfaces).

A communication unit 305 performs a control of wireless communication. Also, the communication unit 305 controls an antenna 306 to perform transmission/reception of a wireless signal for wireless communication. The wireless communication apparatus 101 transmits content of video data and the like to the partner apparatus 102 via the communication unit 305.

Figure 4:
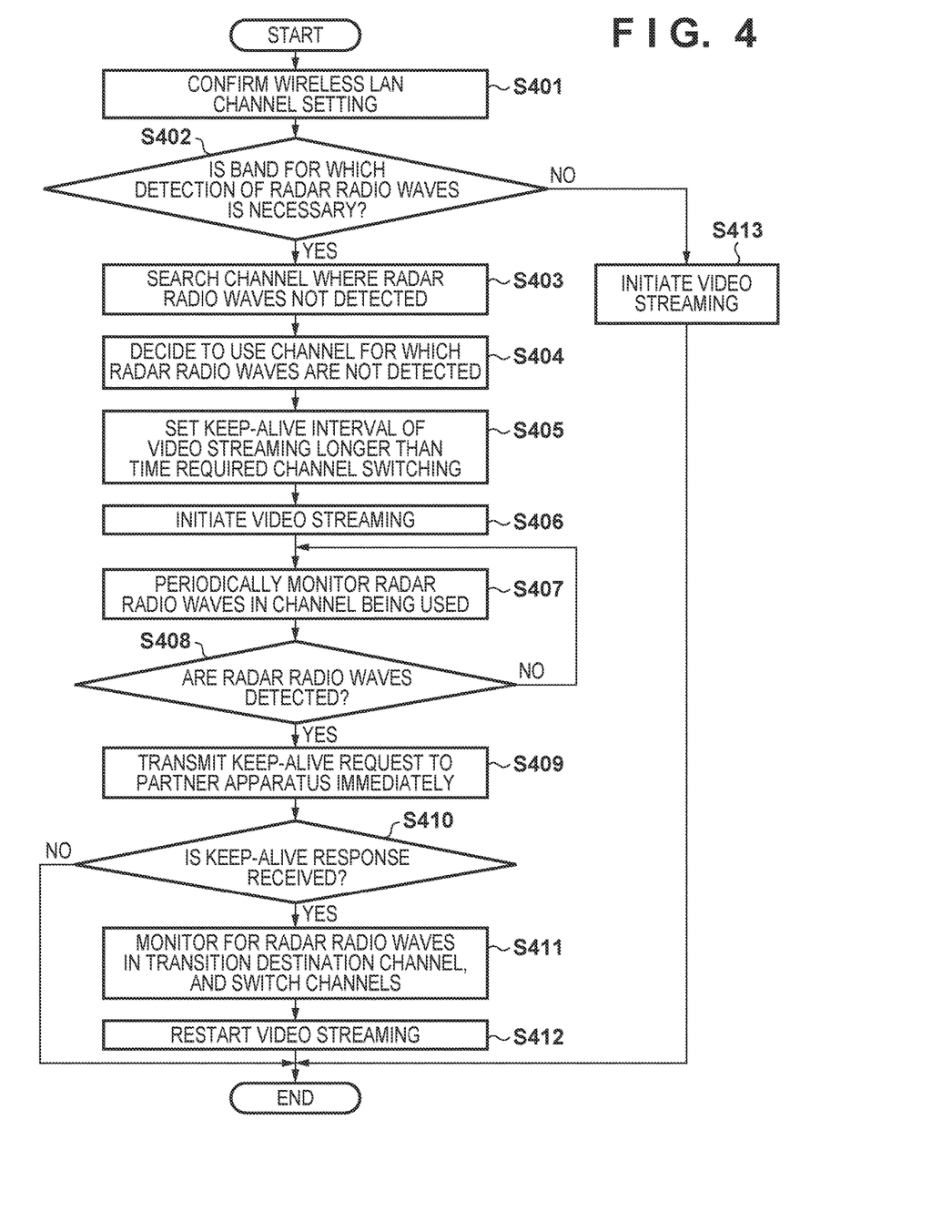
FIG. 4 is a flowchart illustrating an example of a communication processing procedure of the wireless communication apparatus 101 according to the first embodiment.

Continuing on, details of maintaining control of the communication session by the wireless communication apparatus 101 of the present embodiment will be explained using FIG. 4. FIG. 4 is a flowchart for illustrating an example of a communication processing procedure of the wireless communication apparatus 101 according to the present embodiment.

First, the communication session control unit 203 confirms a wireless LAN channel set in the wireless LAN control unit 201 (step S401). A frequency band of the wireless LAN channel, a usable channel number, or the like are included in the set wireless LAN channel. Note, in the wireless LAN control unit 201, there exist cases in which settings of the wireless LAN channel are set by a user operation, settings of the wireless LAN channel are set in advance in the wireless communication apparatus 101, or settings of the wireless LAN channel are selected/set automatically by the wireless communication apparatus 101.

Continuing on, the communication session control unit 203 determines whether or not the frequency band of the wireless LAN channel confirmed in step S401 is a band for monitoring whether or not there is a radar, specifically whether or not the band is such that detection of radar radio waves is required (step S402). A band for which radar radio wave detection is necessary is a W53 band of a 5 GHz band (wireless LAN channel is 52/56/60/64 ch) and W56 (wireless LAN channel is 100/104/108/112/116/120/124/128/132/136/140 ch). Also, though the legal regulations of each country differ, in Japan, a band for which the radar radio wave detection is not required is a band of a W52 wireless LAN channel (36/40/44/48 ch) of the 5 GHz band and a wireless LAN channel of the 2.4 GHz band.

In a case where a result of the determination in step S402 the frequency band of the wireless LAN channel confirmed in step S401 is a band for which radar radio wave detection is required (Yes for step S402), the processing proceeds to step S403. In step S403, the radio wave interference detection unit 204 monitors for radar radio waves in the frequency band of the wireless LAN channel confirmed in step S401 for 60 seconds, and searches for a wireless LAN channel for which radar radio waves are not detected. Here, in a case when the radio wave interference detection unit 204 determines that a radar radio wave is detected during radar monitoring in a specific wireless LAN channel, the monitored wireless LAN channel is transitioned to another wireless LAN channel out of usable channels and radar radio waves are monitored for again in the channel that was transitioned to. The radio wave interference detection unit 204 repeats this processing until radar radio waves cease to be detected. In this step the wireless LAN control unit 201 searches for a wireless LAN channel for which radar is not detected and decides to use a wireless LAN channel that is discovered (step S404). However, the wireless LAN control unit 201 terminates processing for control for maintaining the communication session if a wireless LAN channel for which radar is not detected is not be discovered. In such a case, configuration may be taken such that after a predetermined period elapses, the wireless LAN control unit 201 performs processing according to these steps once again.

Meanwhile, in a case where the frequency band of the wireless LAN channel confirmed in step S401 is a band for which radar radio wave detection is not required (No for step S402), the processing proceeds to step S413. In step S413, the communication session control unit 203 and the video data transmission control unit 202 perform control for initiating video streaming. In the present embodiment, the communication session control unit 203 performs predetermined processing by Wi-Fi Miracast, and in accordance with this, the video data transmission control unit 202 initiates the video streaming to the partner apparatus 102. Also, during the video streaming, the communication session control unit 203 transmits a Keep-Alive request in a predetermined interval to the partner apparatus 102 to maintain/manage the communication session. The Keep-Alive request is an RTSP M16 (GET PARAMETER) request in the case of Wi-Fi Miracast. Note, in step S413, the radio wave interference detection unit 204 may not perform detection or the like of the radar radio waves.

In step S404, after the wireless LAN channel to be used is decided, the communication session control unit 203 sets a transmission interval (Keep-Alive interval) Tk for the Keep-Alive request transmitted to the partner apparatus 102 at a time of the video streaming (step S405). In the present embodiment, the communication session control unit 203 sets the Keep-Alive interval Tk longer than a period T required for wireless LAN channel switching (such that Tk>T). Note, the Keep-Alive interval can be set by a timeout value within an RTSP M6 (SETUP) response in the case of Wi-Fi Miracast. A period T required to switch the wireless LAN channel differs depending on settings of the transition destination channel at a time of detection of radar radio waves. Specifically, in a case of transitioning to a band for which radar radio wave monitoring is required in consideration of usable channels, the period T becomes a period for which the 60 seconds monitoring period in the radio wave interference detection unit 204 is added to the period required for the process for switching the channel in the wireless LAN control unit 201. Also, in a case when transitioning to a band for which monitoring radar radio waves is unnecessary, the period T becomes a period required for processing for switching the channel of the wireless LAN control unit 201.

In step S405, after the communication session control unit 203 sets the Keep-Alive interval Tk, the communication session control unit 203 and the video data transmission control unit 202 initiate video streaming (step S406). Note that explanation of the processing in these steps is omitted because it is the same as for the processing in step S413.

Continuing on, the radio wave interference detection unit 204 monitors for radar radio waves at fixed intervals in the wireless LAN channel that is used (step S407). The radio wave interference detection unit 204 returns the processing to step S407 if it determines that the radar radio waves were not detected in the wireless LAN channel used (No for step S408), and the radio wave interference detection unit 204 continues the monitoring of the radar radio waves.

Meanwhile, if it is determined that radar radio waves were detected in step S407 (Yes of step S408), the communication session control unit 203 transmits a Keep-Alive request to the partner apparatus 102 immediately, regardless of Keep-Alive interval Tk (Step S409). After this, the communication session control unit 203 terminates the Wi-Fi Miracast video streaming according to timeout processing if a Keep-Alive response in response to the Keep-Alive request is not received from the partner apparatus 102 (No for step S410) within a predetermined period.

The radio wave interference detection unit 204 transitions the wireless LAN channel that is monitored to another wireless LAN channel out of the usable channels if the communication session control unit 203 receives the Keep-Alive response from the partner apparatus 102 (Yes for step S410). The radio wave interference detection unit 204 monitors for radar radio waves in the channel if it is necessary to detect radar radio waves for the transition destination wireless LAN channel. If radar radio waves are not detected in the monitored wireless LAN channel, the wireless LAN control unit 201 switches the used channel to the monitored wireless LAN channel (step S411). After this, the video data transmission control unit 202 restarts the video streaming to the partner apparatus 102 (step S412). If the radar radio waves are detected in the monitored wireless LAN channel, processing that is the same as the processing of step S403 is performed.

Note, after determination of the detection of the radar radio waves (Yes for step S408), the wireless communication apparatus 101 can notify a change of the channel to the partner apparatus 102 until usage of the wireless LAN channel that is currently being used is stopped. In such a case, the wireless communication apparatus 101 adds transition destination channel information (a Channel Switch Announcement element) to a wireless management frame such as a Channel Switch Announcement frame, a probe request, a beacon, or the like. Also, in such a case, the wireless communication apparatus 101 can notify that to a user by outputting a display of "during DFS", "during switching of the wireless LAN channel due to radar interference radio wave detection", or the like by the output unit 304. Also, the video data transmission control unit 202 may also stop a transmission of video data initiated in step S406 between from when the wireless communication apparatus 101 detects the radar interference radio waves until the wireless LAN channel switching completes.

Figure 5:
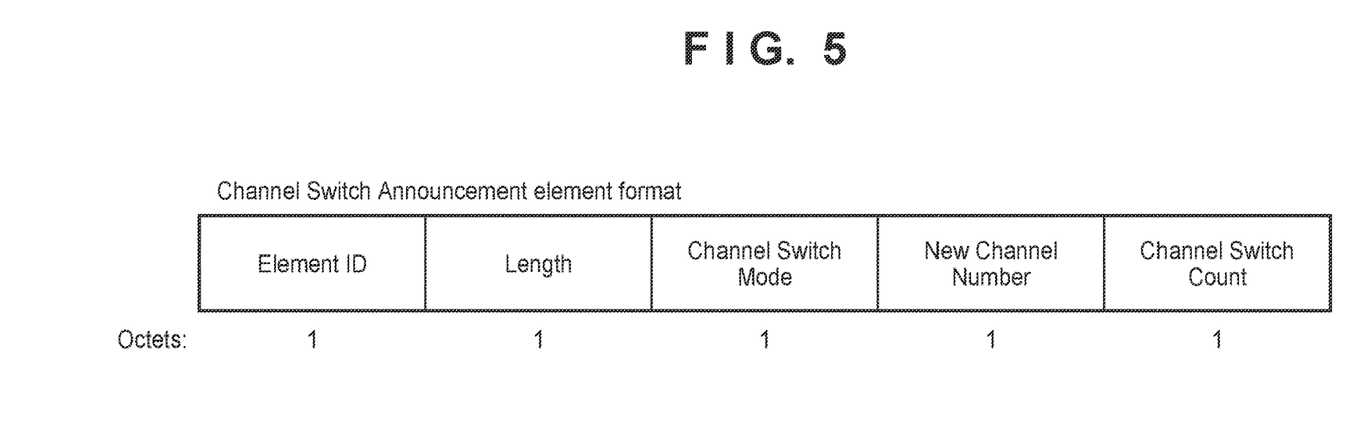
FIG. 5 is a schematic view for illustrating a configuration of a Channel Switch Announcement element format.

FIG. 5 is a schematic view illustrating a configuration of a Channel Switch Announcement element format used as transition destination channel information. By this information, when a new channel is transitioned to, notification of a channel number of the new channel becomes possible. A transition destination channel number is set in the New Channel Number field.

Figure 6:
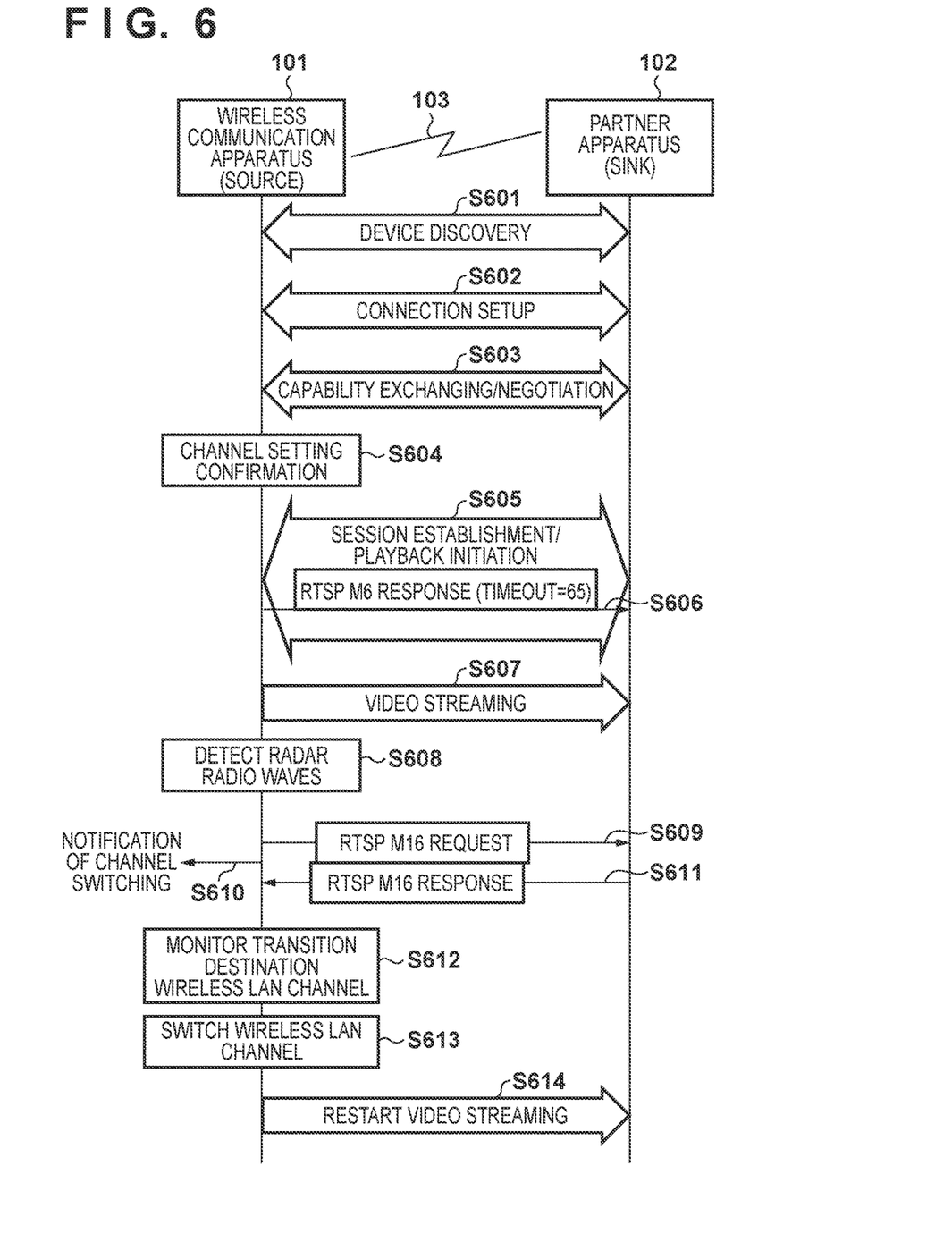
FIG. 6 is a sequence diagram illustrating an example of a communication procedure of the wireless communication apparatus 101 and the partner apparatus 102 according to the first embodiment.

Next, explanation will be given for a connection sequence between the wireless communication apparatus 101 and the partner apparatus 102 in the present embodiment with reference to FIG. 6. FIG. 6 is a description of the connection sequence with the partner apparatus 102 in a case when the wireless communication apparatus 101 detects radar radio waves. Note that here, a Wi-Fi Miracast Source function for the wireless communication apparatus 101 to transmit video streaming is equipped and a Sink function for the partner apparatus 102 to receive the video streaming is equipped. Additionally, a description will be given regarding the wireless communication apparatus 101 becoming a GO (Group Owner) and being equipped with a function that detects the radar radio waves.

Firstly, device discovery (step S601), connection setup (step S602), and capability exchange/negotiation (step S603) are performed between the wireless communication apparatus 101 and the partner apparatus 102. After this, the wireless communication apparatus 101 performs confirmation of a setting of the wireless LAN channel as described in step S401 (step S604). Note, a predetermined wireless management frame is used in the device discovery (step S601) and the connection setup (step S602) based on the Wi-Fi Miracast specification. Also, a predetermined message of previously described RTSP is exchanged between the wireless communication apparatus 101 and the partner apparatus 102 in the capability exchange/the negotiation (step S603). A detailed explanation of the processing of steps S601 to S603 is omitted here.

Continuing on, a setting of the Keep-Alive interval is performed in the session establishment/the playback initiation (step S605). In an example of FIG. 6, it is set to 65 seconds by the timeout value within the RTSP M6 (SETUP) response (step S606). 65 seconds is set as a longer period than a summation of a period required for switching channels and 60 seconds of the radar monitor period of the transition destination wireless LAN channel.

Next, video streaming is initiated from the wireless communication apparatus 101 (step S607). When the wireless communication apparatus 101 determines that radar radio waves are detected (step S608), transmission/reception of the Keep-Alive request/response (RTSP M16 (GET PARAMETER)) is immediately performed (step S609 and step S611). Also, at a time of radar radio wave detection, the wireless communication apparatus 101 notifies the user that a channel is currently switching as described above (step S610). Continuing on, after monitoring for radar radio waves in the transition destination wireless LAN channel (step S612) is performed for 60 seconds, and wireless LAN channel switching (step S613) processing completes, the video streaming is restarted (step S614).

Note, configuration may be taken such that in the step of step S612, if detection of radar radio waves is determined, the wireless communication apparatus 101 sets the Keep-Alive interval to a longer interval than the interval set in step S605, and notifies the set interval to the partner apparatus 102.

As described above, the wireless communication apparatus in the present embodiment sets the Keep-Alive interval longer than for the period required for the wireless LAN channel switching. Also, the wireless communication apparatus transmits the Keep-Alive request immediately if communication stops due to the DFS function. By this, a timeout of the communication session within the wireless LAN channel switching is prevented, and it becomes possible to maintain the communication session even after the wireless LAN channel switching. Also, a user operation for re-connection after a session disconnection and a message exchange with a transmission/reception apparatus become unnecessary, and continuation of the communication becomes possible.

Second Embodiment

The wireless communication apparatus in the first embodiment as described above is configured to set the Keep-Alive interval of the communication session considering the period required for switching the wireless LAN channel according to DFS. In contrast to this in the present embodiment, an example will be described in which the wireless communication apparatus, without changing the Keep-Alive interval of the communication session, skips timeout processing (processing that stops the communication session) even though the Keep-Alive period at a time of the radar radio wave detection elapsed.

Figure 7:
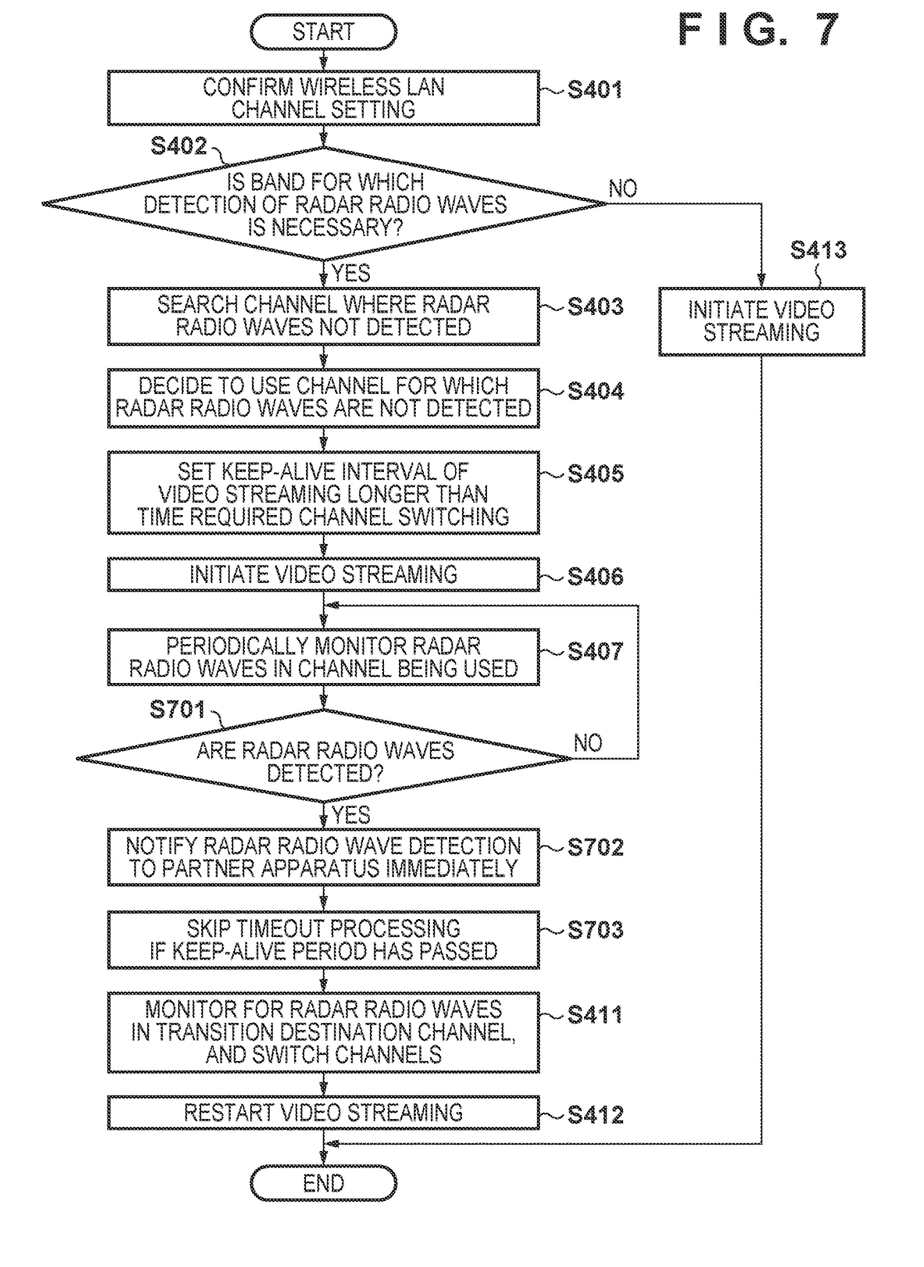
FIG. 7 is a flowchart illustrating an example of a communication processing procedure of the wireless communication apparatus 101 according to a second embodiment.

FIG. 7 is a flowchart illustrating an example of the communication processing procedure of the wireless communication apparatus 101 in the present embodiment. Processing of step S701 through step S703 which differ from FIG. 4 described in the first embodiment is described, and description of the processing of the other steps is omitted.

If the radio wave interference detection unit 204 determines that radar radio waves are detected in step S701 (Yes for step S701), the wireless LAN control unit 201 immediately notifies the partner apparatus 102 that radar radio waves are detected (step S702). Here, a notification method such as, for example, adding radar radio wave detection information to a wireless management frame of a Measurement Report frame or the like is possible.

Figure 8:
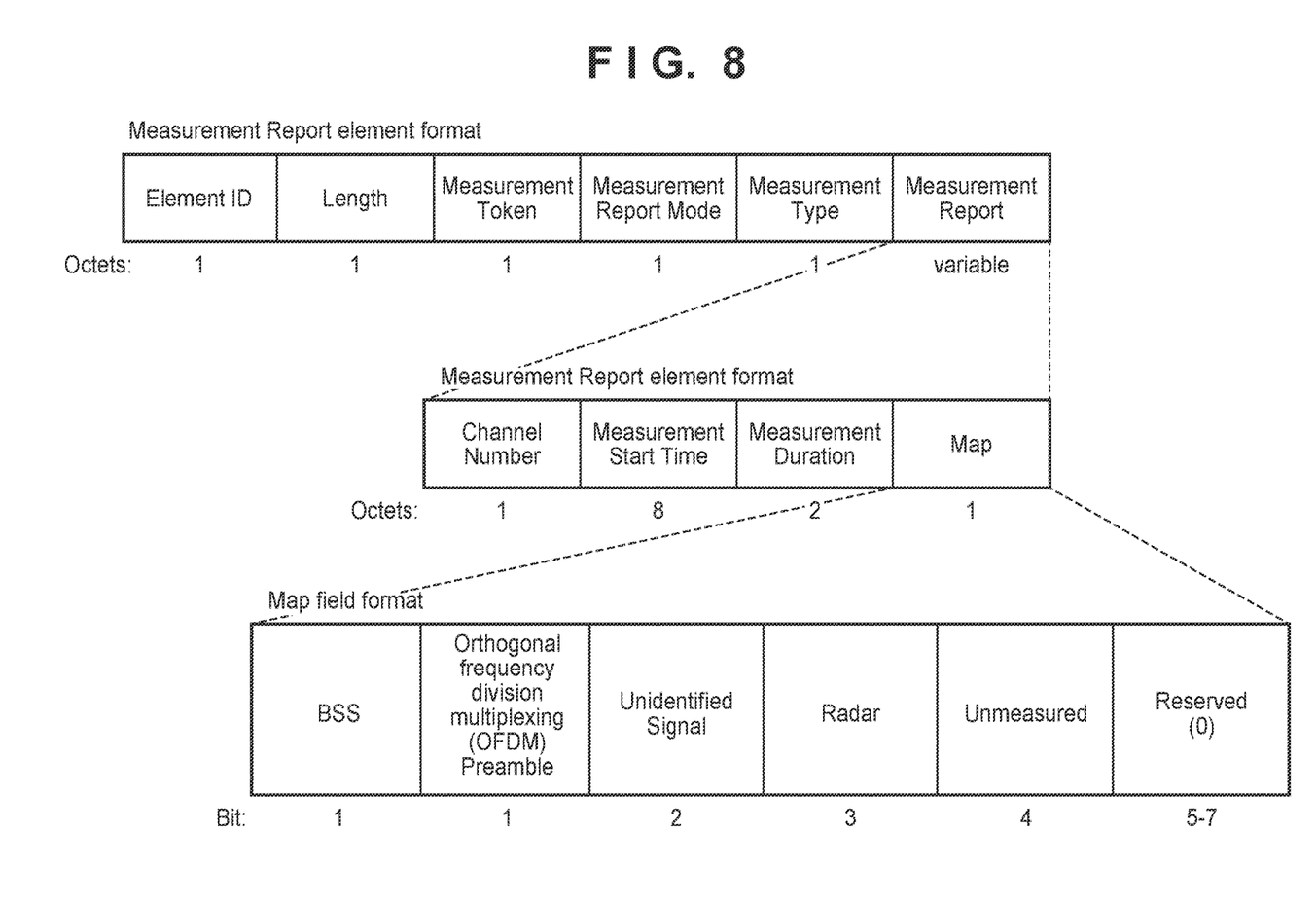
FIG. 8 is a schematic view illustrating a configuration of a Measurement Report element format.

FIG. 8 is a schematic view illustrating a configuration of a Measurement Report element format used as the radar radio wave detection information. In a case in which the radar radio wave is detected, a Radar bit within a Map field is set to 1. Note, the notification method is not limited to a method which uses the Measurement Report frame, and may be a method of notification by a data communication of an independent specification.

Continuing on, the communication session control unit 203 skips the timeout processing even though the period (Keep-Alive period) for Keep-Alive request transmission after the radar radio wave detection has elapsed (step S703). The skip duration is until the wireless LAN channel switching (step S411) completes, and after the wireless LAN channel switching, the original Keep-Alive interval timeout processing restarts.

Figure 9:
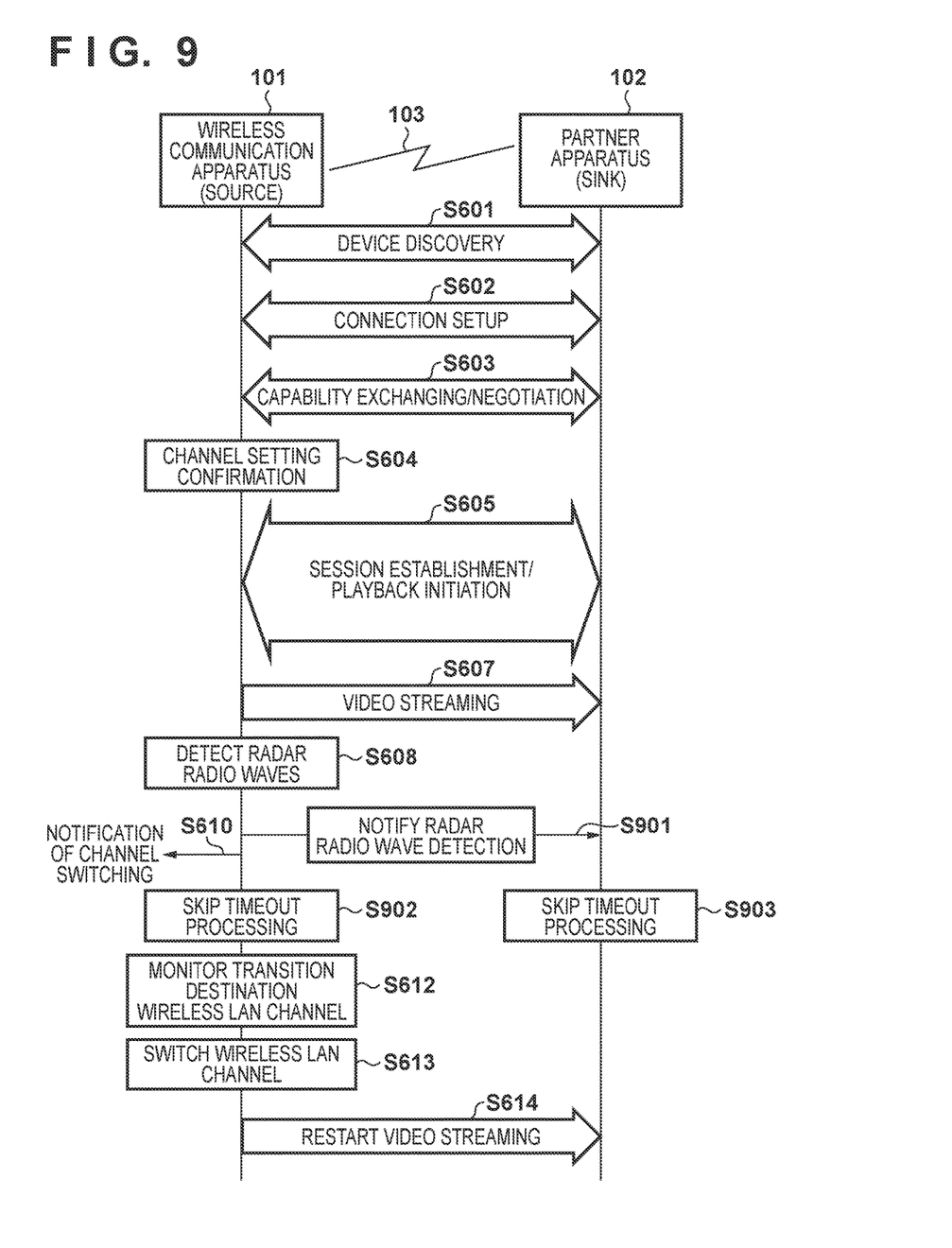
FIG. 9 is a sequence diagram illustrating an example of a communication procedure of the wireless communication apparatus 101 and the partner apparatus 102 according to the second embodiment.

Next, a connection sequence between the wireless communication apparatus 101 and the partner apparatus 102 in the present embodiment will be described with reference to FIG. 9. FIG. 9 describes the connection sequence with the partner apparatus 102 if the wireless communication apparatus 101 detects the radar radio waves. In the same figure, the same numerals for the same parts of FIG. 6 are added, and a detailed description is omitted.

As previously described using FIG. 7, the wireless communication apparatus in the present embodiment does not change the Keep-Alive interval of the communication session. For this reason, without performing a change of the Keep-Alive period (designate that RTSP M6 response timeout=65) in step S606 of FIG. 6, a predetermined time-out period is used as the Keep-Alive interval. Note, in the case of Wi-Fi Miracast, this period is established to be 60 seconds if the timeout value is not designated in the RTSP M6 response.

Also, when the wireless communication apparatus 101 determines that radar radio waves are detected (step S608), it notifies detection of radar radio waves immediately to the partner apparatus 102 as described in step S707 (step S901). Also, both the wireless communication apparatus 101 and the partner apparatus 102 skip the timeout processing even though the Keep-Alive period elapsed from after the radar radio wave detection up until the wireless LAN channel switching completes (step S902 and step S903).

As described above, the wireless communication apparatus in the present embodiment, without changing the Keep-Alive interval of the communication session, skips the timeout processing even though the Keep-Alive period elapsed after the radar radio wave detection. By this, the timeout of the communication session within the wireless LAN channel switching is prevented, and it becomes possible to maintain the communication session even after the wireless LAN channel switching. Also, a user operation for re-connection after a session disconnection and a message exchange with a transmission/reception apparatus becomes unnecessary, and continuation of the communication becomes possible.

Third Embodiment

In the above described first embodiment and second embodiment, configuration is taken such that the wireless communication apparatus 101 detects the radar radio waves. In contrast to this in the present embodiment, an example in which the partner apparatus 102 detects the radar radio waves is described.

Figure 10:
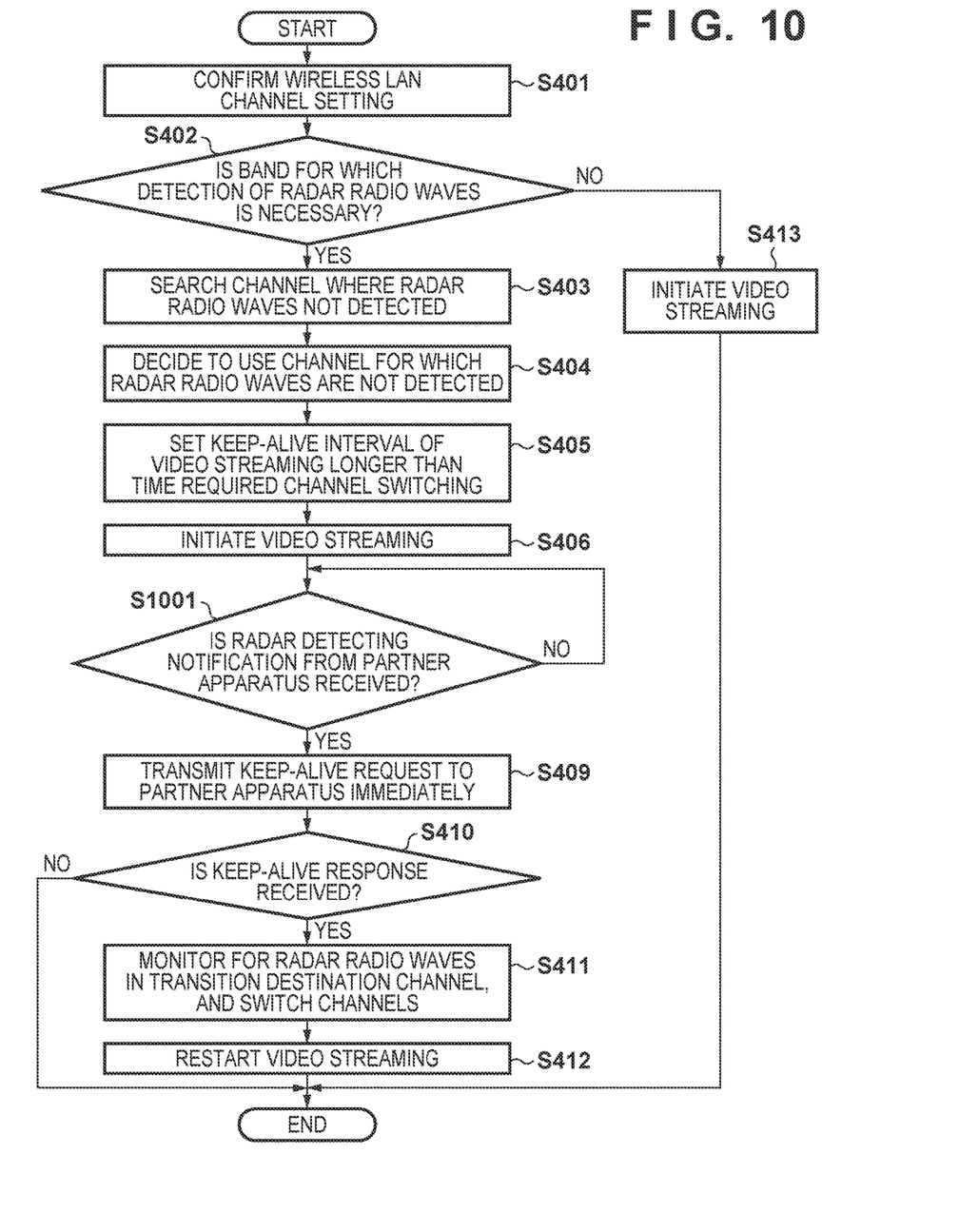
FIG. 10 is a flowchart illustrating an example of a communication processing procedure of the wireless communication apparatus 101 according to a third embodiment.

FIG. 10 is a flowchart illustrating an example of a communication processing procedure of the wireless communication apparatus 101 in the present embodiment. In the first embodiment, processing of step S1001 differing from the described FIG. 4 is described and description of the processing of other steps is omitted.

After the video streaming in step S406 is initiated, the wireless LAN control unit 201 determines whether or not a radar radio wave detection notification is received from the partner apparatus 102 (step S1001). The radar radio wave detection notification is, for example, a wireless management frame of the Measurement Report frame or the like described in the second embodiment. If the wireless LAN control unit 201 received the radar radio wave detection notification from the partner apparatus (Yes for step S1001), the communication session control unit 203 transmits the Keep-Alive request immediately to the partner apparatus 102, and receives a response from the partner apparatus 102.

Figure 11:
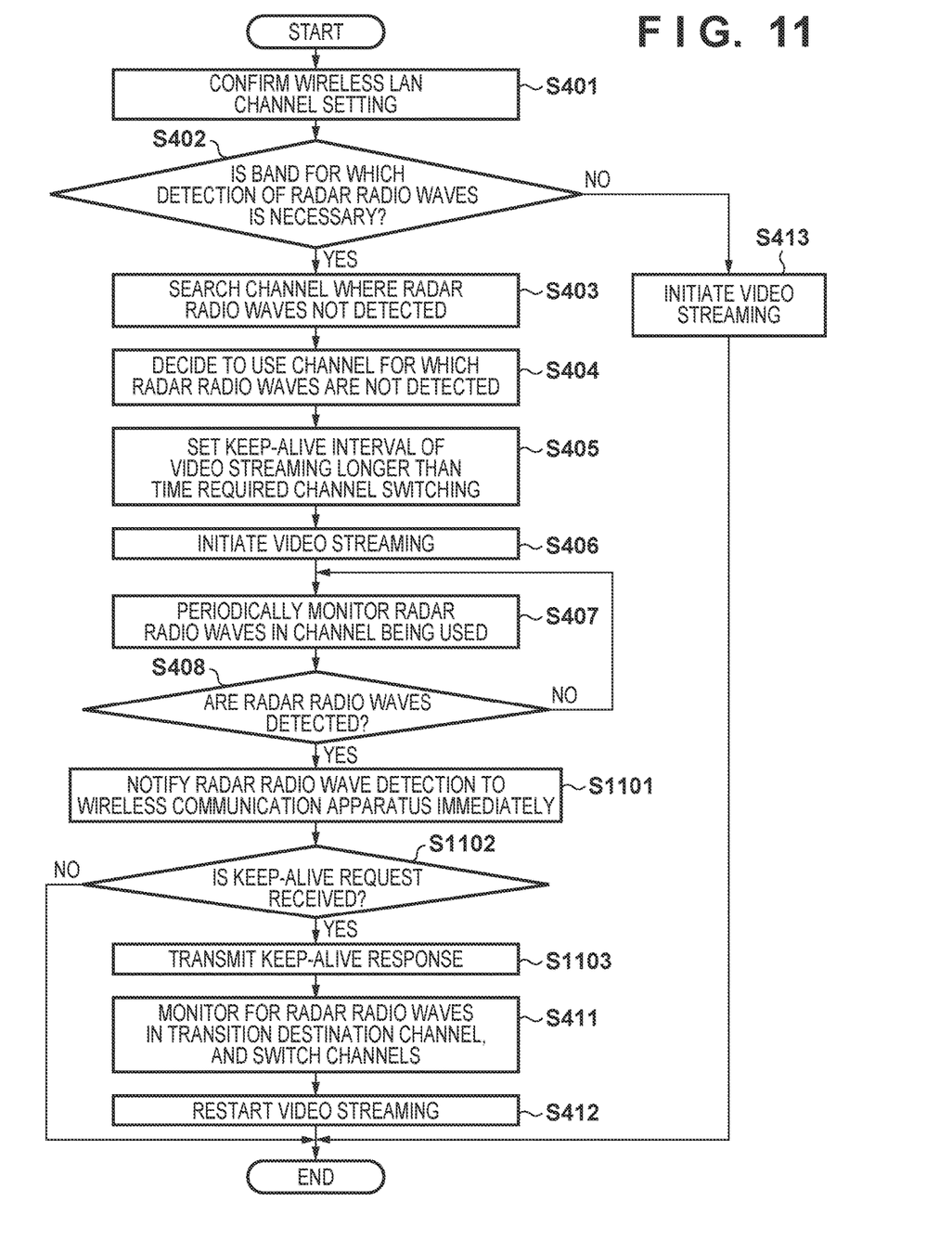
FIG. 11 is a flowchart illustrating an example of a communication processing procedure of the partner apparatus 102 according to the third embodiment.

FIG. 11 is a flowchart illustrating an example of a communication processing procedure of the partner apparatus 102 in the present embodiment. The partner apparatus 102 is assumed to have the same hardware configuration (FIG. 2) and functional configuration (FIG. 3) as the wireless communication apparatus 101. Here, in the first embodiment, processing of step S1101 through step S1103 differing from the described FIG. 4 is described, and description of the processing of other steps is omitted.

After the radar radio wave is detected by the radio wave interference detection unit 204 in step S408 (Yes for step S408), the wireless LAN control unit 201 notifies the radar radio wave detection immediately to the wireless communication apparatus 101 (step S1101). Here, for the notification method the same method as in step S702 described in the second embodiment can be used. Continuing on, the communication session control unit 203 transmits (step S1103) the response to the wireless communication apparatus 101 if the Keep-Alive request is received from the wireless communication apparatus 101 (Yes for step S1102). In this way, even when the radar radio waves are detected on the partner apparatus 102 side, the communication session can be maintained during the wireless LAN channel switching by the wireless communication apparatus 101 and the partner apparatus 102 executing the Keep-Alive processing immediately after the radar radio wave detection.

Figure 12:
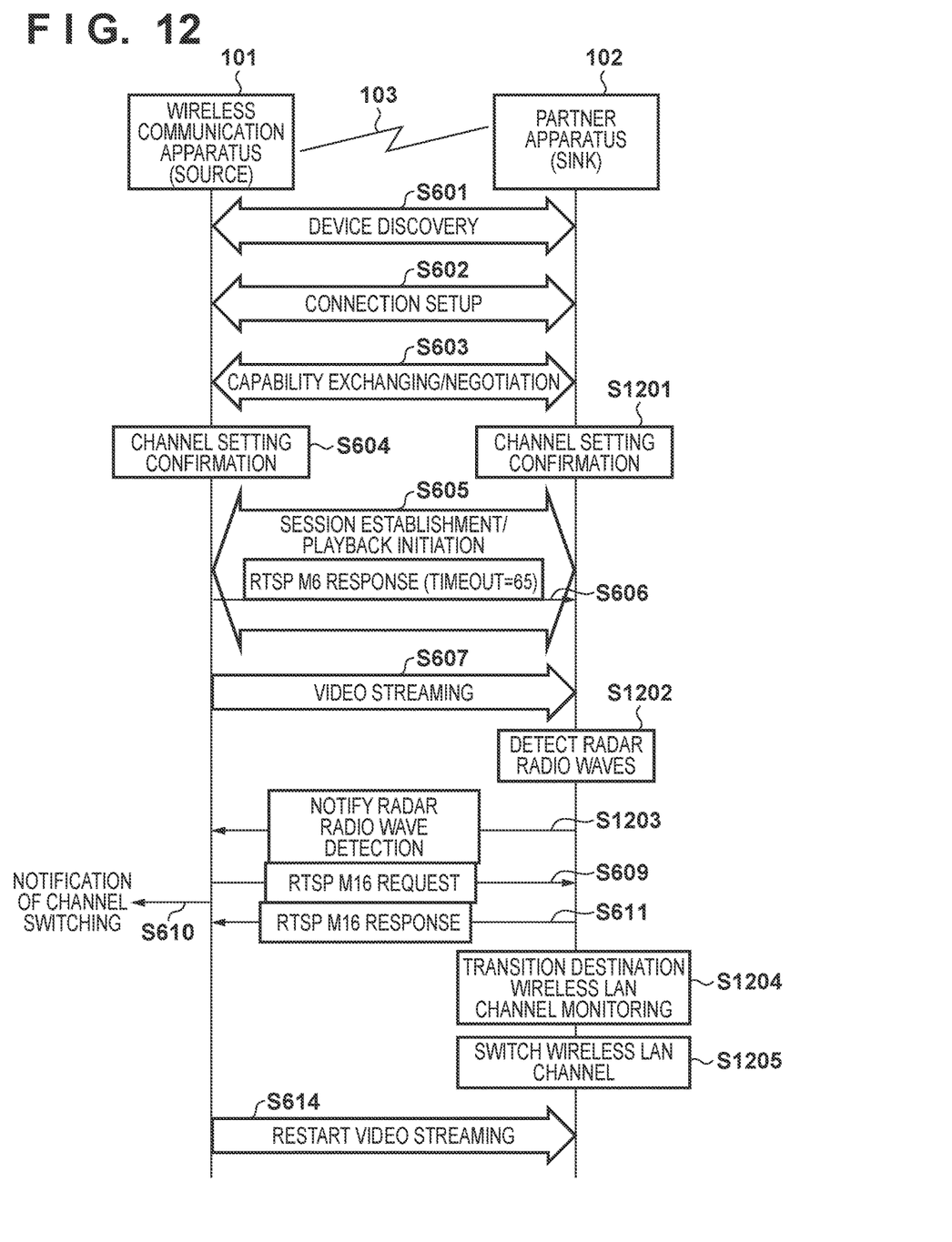
FIG. 12 is a sequence diagram illustrating an example of a communication procedure of the wireless communication apparatus 101 and the partner apparatus 102 according to the third embodiment.

Next, a connection sequence between the wireless communication apparatus 101 and the partner apparatus 102 in the present embodiment will be described with reference to FIG. 12. FIG. 12 describes a connection sequence in a case when the partner apparatus 102 detects the radar radio wave. In the same figure, the same numerals for the same parts of FIG. 6 are added, and a detailed description is omitted. Note, a description will be is given regarding the partner apparatus 102 becoming a GO (Group Owner) and being equipped with a function that detects the radar radio waves.

Firstly, the device discovery (step S601), the connection setup (step S602), and the capability exchange/negotiation (step S603) are performed between the wireless communication apparatus 101 and the partner apparatus 102. After this, the wireless communication apparatus 101 performs confirmation of the setting of the wireless LAN channel as described in step S401 (step S604). Also, the partner apparatus 102 performs confirmation of the setting of the wireless LAN channel by the same procedure as the procedure described in step S401 (step S1201). Continuing on, in session establishment/playback initiation (step S605), setting of the Keep-Alive interval is performed. In the example of FIG. 6, this is set to 65 seconds by the timeout value within the RTSP M6 (SETUP) response (step S606).

Next, the video streaming is initiated from the wireless communication apparatus 101 (step S607). When the partner apparatus 102 detects the radar radio waves (step S1202), detection of the radar radio waves is immediately notified to the wireless communication apparatus 101 (step S1203) as described in step S1101. By this, the wireless communication apparatus 101 determines the detection of the radar radio waves. Continuing on, after radar radio wave monitoring (step S1204) on the transition destination wireless LAN channel is performed for 60 seconds in the partner apparatus 102 after transmission/reception of a Keep-Alive message (RTSP M16 (GET PARAMETER)) is performed (step S609 and step S611), video streaming is restarted (step S614) after wireless LAN channel switching (step S1205) processing completes.

As described above, in the present embodiment, even in the case where the partner apparatus 102 detects radar radio waves, the partner apparatus 102 notifies the radar radio wave detection to the wireless communication apparatus 101 and immediately performs the Keep-Alive processing. By this, a timeout of the communication session during the wireless LAN channel switching is prevented, and it becomes possible to maintain the communication session even after the wireless LAN channel switching. Also, a user operation for re-connection after a session disconnection and a message exchange with a transmission/reception apparatus becomes unnecessary, and continuation of the communication becomes possible.

With such a configuration, according to the above embodiment, even if the communication is stopped due to the DFS function during communication by the wireless LAN, it is possible to maintain the communication session. For this reason, communication is continued without a user operation for re-connection or a message exchange with a transmission/reception apparatus, and user convenience improves.

Although RTP is used as the data transfer protocol in the previously described embodiments, limitation is not made to RTP, and it is possible to use another protocol of the same layer of the OSI reference model such as HTTP, HTTPS, or TCP, or another protocol of a different layer.

Also, while in the previously described embodiment, an example using RTSP as the playback control protocol is described, it is also possible to use a playback control protocol other than RTSP such as SIP (Session Initiation Protocol) or SOAP (Simple Object Access Protocol) or the like.

While examples of the embodiments are described in detail above, embodiments for the present invention as, for example, a system, an apparatus, a method, a program, a recording medium (a storage medium), or the like are possible. More specifically, application to a system comprised from a plurality of devices (such as a host computer, an interface device, an image capture device, or a web application for example) may be performed, and application to an apparatus comprising a single device may be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-199720, filed Oct. 7, 2015 which is hereby incorporated by reference herein in its entirety.

What is claimed is:

1. A communication apparatus, comprising:
   at least one memory storing instructions; and
   at least one processor that, upon execution of the instructions stored in the at least one memory, causes the communication apparatus to:
   establish a communication session with another communication apparatus in a predetermined wireless channel;
   determine a detection of a radar wave in the predetermined wireless channel;
   transmit, in a case where the communication session is established, a predetermined signal for maintaining the communication session at a predetermined interval; and
   transmit the predetermined signal even before the predetermined interval comes in response to the detection of the radar wave in the predetermined wireless channel being determined so as to maintain the communication session.

2. The communication apparatus according to claim 1, wherein the communication apparatus detects the radar wave in the predetermined wireless channel, and performs the determination based on the detection of the radar wave.

3. The communication apparatus according to claim 2, wherein the communication apparatus notifies the other communication apparatus that the radar wave is detected.

4. The communication apparatus according to claim 1, wherein the communication apparatus:
   receives in the predetermined wireless channel from the other communication apparatus a notification indicating that the radar wave is detected, and
   performs the determination based on the notification received from the other communication apparatus.

5. The communication apparatus according to claim 1, wherein the communication apparatus sets a wireless channel in which the communication apparatus performs communication with the other communication apparatus, and
   wherein in a case where the detection of the radar wave in the set wireless channel is determined, the communication apparatus switches the wireless channel in which communication is performed with the other communication apparatus to another wireless channel.

6. The communication apparatus according to claim 5, wherein the predetermined interval is longer than a period required for the communication apparatus to switch to the other wireless channel.

7. The communication apparatus according to claim 1, wherein the communication session is a transport layer communication session.

8. The communication apparatus according to claim 1, wherein the communication session is a communication session for transmitting/receiving video data.

9. A communication apparatus, comprising:
at least one memory storing instructions; and
at least one processor that, upon execution of the instructions stored in the at least one memory, causes the communication apparatus to:
establish a communication session with another communication apparatus in a predetermined wireless channel;
determine a detection of a radar wave in the predetermined wireless channel;
receive, in a case where the communication session is established, a predetermined signal for maintaining the communication session at a predetermined interval; and
maintain the communication session even if the communication apparatus does not receive the predetermined signal at the predetermined interval based on the detection of the radar wave in the predetermined wireless channel being determined, in a case where the communication session is established and the detection of the radar wave in the predetermined wireless channel is determined.

10. The communication apparatus according to claim 9, wherein the communication apparatus
detects the radar wave in the predetermined wireless channel, and
performs the determination based on the detection of the radar wave.

11. The communication apparatus according to claim 10, wherein the communication apparatus notifies the other communication apparatus that the radar wave is detected.

12. The communication apparatus according to claim 9, wherein the communication apparatus:
receives a notification indicating that the radar wave is detected in the predetermined wireless channel from the other communication apparatus, and
performs the determination based on the notification received from the other communication apparatus.

13. The communication apparatus according to claim 9, wherein the communication apparatus sets a wireless channel in which the communication apparatus performs communication with the other communication apparatus, and
wherein in a case where the detection of the radar wave in the set wireless channel is determined, the communication apparatus switches the wireless channel in which communication is performed with the other communication apparatus to another wireless channel.

14. The communication apparatus according to claim 13, wherein the predetermined interval is longer than a period required for the communication apparatus to switch to the other wireless channel.

15. The communication apparatus according to claim 9, wherein the communication session is a transport layer communication session.

16. The communication apparatus according to claim 9, wherein the communication session is a communication session for transmitting/receiving video data.

17. A communication method comprising:
establishing a communication session in a predetermined wireless channel;
determining a detection of a radar wave in the predetermined wireless channel;
transmitting, in a case where the communication session is established, a predetermined signal for maintaining the communication session at a predetermined interval; and
transmitting the predetermined signal even before the predetermined interval comes in response to detection of the radar wave in the predetermined wireless channel being determined so as to maintain the communication session.

18. A communication method comprising:
establishing a communication session in a predetermined wireless channel;
determining a detection of a radar wave in the predetermined wireless channel;
receiving, in a case where the communication session is established, a predetermined signal for maintaining the communication session at a predetermined interval; and
maintaining, in a case where the communication session is established and detection of the radar wave in the predetermined wireless channel is determined, the communication session even if a communication apparatus does not receive the predetermined signal at the predetermined interval based on the detection of the radar wave in the predetermined wireless channel being determined.

19. A non-transitory computer-readable storage medium storing a computer program for controlling a computer to execute a communication method, the method comprising:
establishing a communication session in a predetermined wireless channel;
determining a detection of a radar wave in the predetermined wireless channel;
transmitting, in a case where the communication session is established, a predetermined signal for maintaining the communication session at a predetermined interval; and
transmitting the predetermined signal even before the predetermined interval comes in response to detection of the radar wave in the predetermined wireless channel being determined so as to maintain the communication session.

20. A non-transitory computer-readable storage medium storing a computer program for controlling a computer to execute a communication method, the method comprising:
establishing a communication session in a predetermined wireless channel;
determining a detection of a radar wave in the predetermined wireless channel;
receiving, in a case where the communication session is established, a predetermined signal for maintaining the communication session at a predetermined interval; and
maintaining, in a case where the communication session is established and detection of the radar wave in the predetermined wireless channel is determined, the communication session even if a communication apparatus does not receive the predetermined signal at the predetermined interval based on the detection of the radar wave in the predetermined wireless channel being determined.

* * * * *